No. 853,158. PATENTED MAY 7, 1907.
H. F. BRUSSOW.
PLOW.
APPLICATION FILED AUG. 29, 1906.
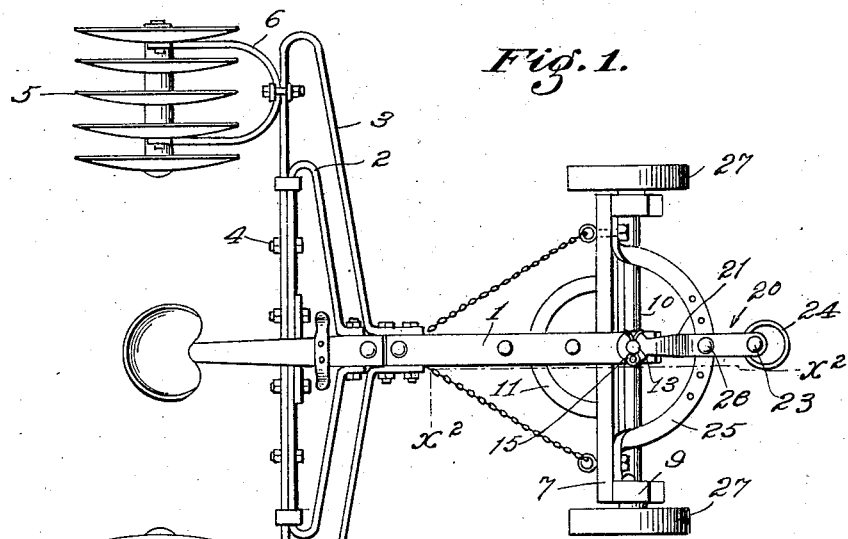
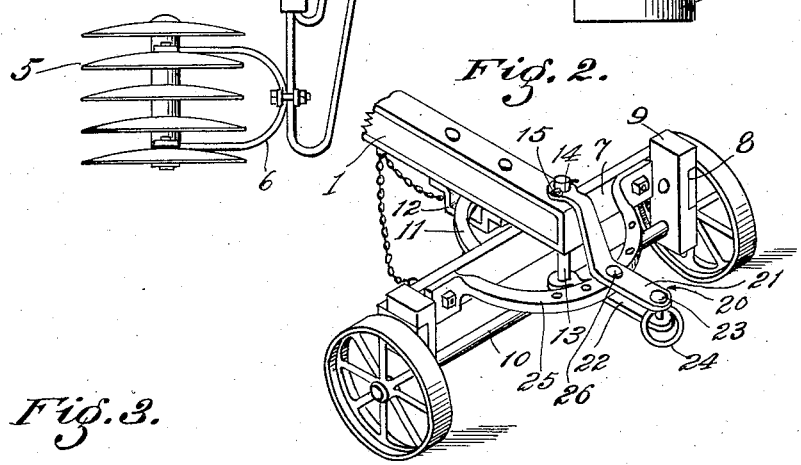
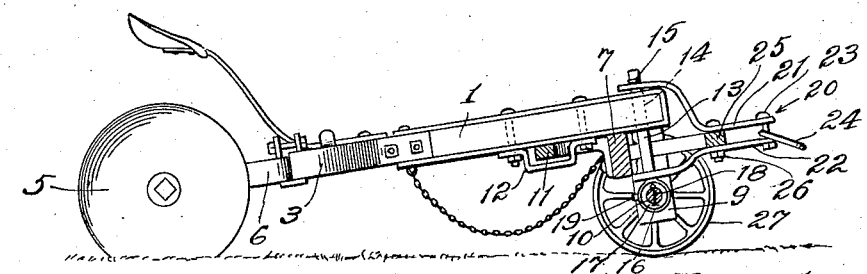
Witnesses
C. C. Holly
J. Townsend
Inventor
Herman F. Brussow
by James R. Townsend
his atty
THE NORRIS PETERS CO., WASHINGTON, D. C.

UNITED STATES PATENT OFFICE.

HERMAN F. BRUSSOW, OF WHITTIER, CALIFORNIA.

PLOW.

No. 853,158.  Specification of Letters Patent.  Patented May 7, 1907.

Application filed August 29, 1906. Serial No. 332,545.

To all whom it may concern:

Be it known that I, HERMAN F. BRUSSOW, a citizen of the United States, residing at Whittier, in the county of Los Angeles and State of California, have invented new and useful Improvements in Plows, of which the following is a specification.

This invention has reference to improvements in a disk-harrow, and particular reference to that class of cultivators designed for use in orchard work; one of the objects of the invention being to provide a harrow which will readily and easily till the soil in and about the trunks of fruit trees, especially where the limbs and branches of the trees are depending and hang in close proximity to the ground.

Another object of this invention is to provide suitable means whereby this cultivator may be thrown into the immediate vicinity of the fruit trees without liability of injuring the trunks or shaking the fruit from the trees.

One of the most serious drawbacks encountered hitherto in cultivators of the present type has resided in the high frame carrying the disks. I propose with this invention to do away with high frames on disk-harrows, and obtain greater and more satisfactory results than have been hitherto possible.

The accompanying drawing illustrates the invention:

Figure 1 is a plan view of the cultivator. Fig. 2 is a fragmentary perspective. Fig. 3 is a side elevation partly in section.

Reference being had to the drawing, 1 shows a beam having attached thereto outwardly-extending frames 2 and frames 3 which extend beyond the limits of said frames 2 and also beyond the width of the truck of the implement. These frames 3 are fixed to said frames 2 in any suitable manner, as for instance by bolts seen at 4, in order to allow of the removal of said frames 3 in case they are not required for use. On to said frames 3 are mounted a plurality of disk members 5 by means of a bracket 6 which is adjustable on said frames 3, and by means of which the disks may be slid to the extreme outer end of said frames 3, or to the innermost end. Said bracket 6, instead of being placed in a position vertical with respect to the disk members 5, is positioned horizontally with respect thereto, as is obvious from the drawing.

In implements of like character hitherto employed, the means for supporting the frame upon the disks consisted in a bracket which was placed vertically upon the axle carrying the disks. In this manner the frame of the entire implement was raised to a height which made the use of the implement as an orchard implement, almost impossible, because of the fact that the same could not be operated in close proximity to trees, especially orange trees, where the branches are low-hanging. The trees invariably suffered from bruises, etc., and even then all attempts to carry the disk-harrow within proper distance of the trunk of the tree, in order to destroy vegetation and thoroughly till the soil about the roots of the tree, were forestalled by such low-hanging branches which impeded the progress of the team. For that reason I have constructed this arrangement for supporting the disks on the frame members, in order principally to bring the frame as near to the ground as possible and obtain the best and most thorough tilling of the soil by means of the disks, thereby obviating the dangers of injuring the bark of the trees as well as that of breaking off some of the limbs and shaking down the fruit. Furthermore, I secure in this manner the greatest weight of the entire implement upon the disks which is a necessary factor in the tilling of the soil where its pulverization is requisite. The beam 1 extending forwardly from the frames or members 2 and 3, rests upon a member 7 which is arranged to engage the rabbet 8 provided in the standards or supports 9, which in turn are loosely mounted upon the axle 10 of the implement.

In my application Serial No. 321,147, filed June 11, 1906, I have described and shown a cultivator in which the draft tongue has been dispensed with by shortening the beam and allowing it to rest upon the axle of the forward truck. I have found that greater and better results can be obtained by positioning the beam upon the member 7, as illustrated in the present drawing, the results consisting primarily in the attainment of greater efficiency of the disk members.

The fifth wheel 11 is secured to the rear of said member 7 and extends through a cleat 12 provided on the under side of the beam 1, which cleat serves to guide said fifth wheel in its semicircular travel.

A king-bolt 13 is loosely mounted upon the axle 10 and extends upwardly through the forward end of the beam 1, as shown at 14. A cotter-pin 15 extends through the shank portion of said king-bolt and tends to secure said beam in place. As will be seen from the drawing, this king-bolt is provided with an apertured head 16 by means of which it loosely fits the axle 10.

On either side of the apertured portion of said king-bolt 13 are a plurality of washers 17 arranged to hold the king-bolt in place and prevent the accidental sliding of the same on said axle 10. These washers are rigidly held on said axle by means of cotter-pins 18. The king-bolt is furthermore secured against movement by a set-screw 19.

A tongue 20, composed of two parts 21 and 22, extends forwardly of the implement, the arm 21 being held in position by the king-bolt 13 and resting on beam 1. The other arm 22 of said tongue is arranged to be slid over the king-bolt and sit upon the apertured head of the same. The two portions of the tongue extending forward are secured together by a bolt 23, and a clevis 24 is provided in the forward portion of said extension, on to which single or double trees may be attached for the purpose of drawing the implement.

The part 22 of the tongue engages the king-bolt 13, this arrangement permitting of the greatest weight to be thrown on the rear of the device by reason of the pull exerted by the horses. This part 22, together with the fifth wheel 11, allows nearly all of the weight to be transferred to the disk members.

A segment 25 is fixed to said member 7 and extends between the parts 21 and 22 of the tongue 20. The tongue is adjustably held in this segment by a pin 26, the disposition of which from one side to the other throws the disk members out of parallel alinement relative to the axle. The beam 1 is supported by the member 7 and has pivotal connection with the axle 10 through the king-bolt 13.

It is understood, of course, that wheels 27 are journaled on to the shaft 10.

What I claim is:—

1. The combination with an axle and a pair of wheels journaled thereon, of a beam having rearwardly and outwardly extending frames, disks mounted on said frames, a plurality of standards and a cross bar for supporting said beam above said axle, said standards being loosely mounted upon said axle, a king-bolt for pivotally connecting said beam with said axle, and means for varying the direction of travel of said disks.

2. The combination with an axle and a pair of wheels journaled thereon, of standards mounted on said axle, a connection between said standards, a yoke carried by said connection, a beam, a king-bolt secured to said axle and extending through said beam, a tongue secured to said king-bolt and extending forwardly of said beam, said tongue being laterally adjustable upon said yoke, and a fifth wheel carried by said connection.

3. The combination with an axle and a pair of wheels journaled thereon, of standards carried by said axle, a connection between said standards, a yoke carried by said connection, a king-bolt mounted on said axle, a beam secured to said king-bolt and resting on said connection, a fifth wheel carried by said connection, and means for movably securing said fifth wheel to said beam, a tongue extending forwardly of said beam and engaging said yoke, said tongue being shiftable with respect to said yoke and said beam, said beam being provided with a plurality of frames extending rearwardly and outwardly beyond the width of said wheels, and disk members adjustably mounted on said frames.

4. The combination with an axle and a pair of wheels journaled thereon, of a beam having frames extending beyond the width of said wheels, means for supporting said beam above said axle comprising a plurality of standards, and a cross bar, said standards being loosely mounted with respect to the axle, and means for permitting movement of said beam relatively to the axle.

5. The combination with an axle and a pair of wheels journaled thereon, of a plurality of standards carried by said axle, a connection between said standards, an arc on said connection having orifices, a beam supported by said connection, a king-bolt on said axle extending through said beam to pivotally secure it thereto, a two-part tongue on said king-bolt, said tongue being adjustable on said arc, a fifth wheel on said connection, a bracket for supporting said fifth wheel, and means for limiting the movement of said axle.

In testimony whereof, I have hereunto set my hand at Los Angeles California this 16th day of August 1906.

HERMAN F. BRUSSOW.

In presence of—
ANTON GLOETZNER,
JAMES R. TOWNSEND.